(12) United States Patent
DeLuca et al.

(10) Patent No.: US 9,658,847 B2
(45) Date of Patent: May 23, 2017

(54) MANAGING CHANGE-SET DELIVERY

(71) Applicant: International Business Machines Corporation, Armonk, NY (US)

(72) Inventors: Lisa Seacat DeLuca, San Francisco, CA (US); Soobaek Jang, Hamden, CT (US); Troy M. Volin, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 14/665,307

(22) Filed: Mar. 23, 2015

(65) Prior Publication Data

US 2015/0193231 A1    Jul. 9, 2015

Related U.S. Application Data

(63) Continuation of application No. 14/228,506, filed on Mar. 28, 2014, and a continuation of application No. 13/099,593, filed on May 3, 2011, now abandoned.

(51) Int. Cl.
*G06F 9/44* (2006.01)

(52) U.S. Cl.
CPC . *G06F 8/71* (2013.01); *G06F 8/70* (2013.01)

(58) Field of Classification Search
CPC ..................................... G06F 8/71; G06F 8/70
USPC ......................................... 717/120, 121, 122
See application file for complete search history.

(56) References Cited

U.S. PATENT DOCUMENTS

| | | | |
|---|---|---|---|
| 4,558,413 A | 12/1985 | Schmidt et al. | |
| 4,864,569 A * | 9/1989 | DeLucia | G06F 8/71 714/38.1 |
| 6,449,624 B1 | 9/2002 | Hammack et al. | |
| 6,678,882 B1 * | 1/2004 | Hurley | G06F 8/315 717/121 |
| 6,708,310 B1 | 3/2004 | Sung et al. | |
| 6,757,893 B1 | 6/2004 | Haikin | |
| 7,716,649 B2 | 5/2010 | Clemm et al. | |
| 7,779,387 B2 | 8/2010 | Harry et al. | |
| 7,827,565 B2 | 11/2010 | Minium, Jr. et al. | |

(Continued)

OTHER PUBLICATIONS

Aizenbud-Reshef et al., "Model Traceability", 2006.*

(Continued)

*Primary Examiner* — Phillip H Nguyen
(74) *Attorney, Agent, or Firm* — John R. Pivnichny; Madeline F. Schiesser; Keohane & D'Alessandro PLLC

(57) ABSTRACT

An approach that analyzes and manages unresolved (i.e., pending, outgoing) change-sets is provided. Specifically, this approach parses the change-set into a plurality (i.e., one or more) of changes to determine the impact each change may have. An alert may be provided to the user indicating whether the change-set should be checked-in based on the determined impact. Specifically, a change-set management tool provides this capability. The change-set management tool includes a parsing module configured to receive an outgoing change-set and to parse the change-set into a plurality of changes. The change-set management tool further comprises an evaluation module configured to evaluate an impact that each of the plurality of changes within the change-set has on source code external to the change-set and other changes of the plurality of changes within the change-set.

20 Claims, 5 Drawing Sheets

(56) References Cited

U.S. PATENT DOCUMENTS

| | | | |
|---|---|---|---|
| 7,856,615 B2 | 12/2010 | Clemm et al. | |
| 7,860,959 B1 | 12/2010 | Karpati et al. | |
| 7,908,601 B2 | 3/2011 | Clemm et al. | |
| 8,312,415 B2* | 11/2012 | Marius | G06F 8/70 717/100 |
| 8,359,571 B2 | 1/2013 | Clemm et al. | |
| 8,584,100 B2* | 11/2013 | Xu | G06F 11/368 717/126 |
| 9,129,038 B2* | 9/2015 | Begel | G06F 8/74 |
| 2003/0005093 A1 | 1/2003 | Deboer et al. | |
| 2003/0177481 A1* | 9/2003 | Amaru | G06F 17/30914 717/148 |
| 2005/0235012 A1 | 10/2005 | Harry et al. | |
| 2005/0262488 A1* | 11/2005 | Wagner | G06F 8/71 717/144 |
| 2005/0268281 A1* | 12/2005 | Letkeman | G06F 17/241 717/120 |
| 2006/0168565 A1* | 7/2006 | Gamma | G06F 11/3688 717/122 |
| 2006/0282479 A1 | 12/2006 | Johnson et al. | |
| 2007/0067373 A1 | 3/2007 | Higgins et al. | |
| 2007/0143752 A1 | 6/2007 | Clemm et al. | |
| 2007/0240147 A1 | 10/2007 | Bernabeu-Auban et al. | |
| 2007/0266367 A1* | 11/2007 | Nadon | G06F 8/71 717/104 |
| 2008/0104581 A1 | 5/2008 | Clemm et al. | |
| 2008/0120591 A1 | 5/2008 | Clemm et al. | |
| 2008/0301639 A1* | 12/2008 | Bell | G06F 8/71 717/120 |
| 2009/0144703 A1* | 6/2009 | Vairavan | G06F 8/20 717/122 |
| 2009/0182707 A1 | 7/2009 | Kinyon et al. | |
| 2009/0254538 A1* | 10/2009 | Arthurs | G06F 17/2288 |
| 2010/0114962 A1 | 5/2010 | Ahadian et al. | |
| 2010/0131940 A1 | 5/2010 | Jazdzewski et al. | |
| 2014/0013304 A1* | 1/2014 | Vangala | G06F 8/75 717/123 |

OTHER PUBLICATIONS

Robbes et al., "Versioning Systems for Evolution Research", 2005.*

Kern et al., "Automatic Error Correction of Java Programs", 2010.*

Ren et al., "Identifying Failure Causes in Java Programs: An Application of Change Impact Analysis", 2006.*

"Centralized Workflow Tutorial", Bazaar Developers, Release 2.2.5dev, Apr. 3, 2011, 5 pages. No author cited.

Stansberry, G., "7 Version Control Systems Reviewed", Smashingmagazine.com, Sep. 18, 2008, 20 pages.

Sun et al, "Change Impact Analysis Based on a Taxonomy of Change Types", Computer Software and Applications Conference (COMPSAC), 2010 IEEE 34th Annual, Jul. 19-23, 2010, 2 pages.

Huzefa Kagdi, "Improving Change Prediction with Fine-Grained Source Code Mining", ASE'07, Nov. 5-9, 2007, Atlanta, Georgia, 4 pages.

Andreas Zeller, "Configuration Management with Version Sets a Unified Software Versioning Model and its Applications", Apr. 1997, 320 pages.

Canfora et al., "Impact Analysis by Mining Software and Change Request Repositories", 11th IEEE International Software Metrics Symposium (METRICS 2005), Copyright 2005 IEEE, 9 pages.

Hattori et al., "On the Precision and Accuracy of Impact Analysis Techniques", Seventh IEEE/ACIS International Conference on Computer and Information Science, Copyright 2008 IEEE, 6 pages.

Kagdi et al., "Mining Software Repositories for Traceability Links", 2007, 10 pages.

Huang et al., "Dynamic Impact Analysis Using Execution Profile Tracing", Proceedings of the Fourth International Conference on Software Engineering Research, Management and Applications (SERA'06), Copyright 2006 IEEE, 7 pages.

Phillip H. Nguyen, USPTO Office Action, U.S. Appl. No. 13/099,593, Notification Date Apr. 24, 2013, 16 pages.

Phillip H. Nguyen, USPTO Final Office Action, U.S. Appl. No. 13/099,593, Notification Date Sep. 17, 2013, 10 pages.

Phillip H. Nguyen, USPTO Notice of Allowance and Fee(s) Due, U.S. Appl. No. 13/099,593, Date Mailed Dec. 10, 2013, 19 pages.

Phillip H. Nguyen, USPTO Notice of Allowance and Fee(s) Due, Application U.S. Appl. No. 14/228,506, Date Mailed Dec. 23, 2014, 23 pages.

Sukanya Ratanotayanon et al., "Using Transitive Changesets to Support Feature Location", ASE '10, Sep. 20-24, 2010, Antwerp, Belgium, Copyright 2010 ACM, pp. 341-344.

Martin P. Robillard et al., "Recommending change clusters to support software investigation: an empirical study", Journal of Software Maintenance and Evolution: Research and Proctice, J. Softw. Maint. Evol.: Res. Pract, 2010, Copyright 2009 John Wiley & Sons, Ltd., pp. 143-164.

Michele Ceccarelli et al., "An Eclectic Approach for Change Impact Analysis", ICSE '10, May 2-8, 2010, Cape Town, South Africa, Copyright 2010 ACM, 4 pages.

* cited by examiner

MANAGING CHANGE-SET DELIVERY

RELATED U.S. APPLICATION DATA

This application is a continuation of, and claims the benefit of, co-pending and co-owned U.S. patent application Ser. No. 14/228,506, filed Mar. 28, 2014, entitled "MANAGING CHANGE-SET DELIVERY", the disclosure of which is incorporated herein by reference. This application is also related in some aspects to the commonly owned U.S. patent application Ser. No. 13/099,593, filed May 3, 2011, entitled "MANAGING CHANGE-SET DELIVERY", the disclosure of which is incorporated herein by reference.

FIELD OF THE INVENTION

The present invention generally relates to collaborative software development. Specifically, the present invention relates to change-set delivery management for software development.

BACKGROUND OF THE INVENTION

Software development is oftentimes performed by a group or team of developers. A subject software system is developed through design efforts, test efforts, implementation efforts and maintenance efforts. There may be different groups and different group members participating in each of these efforts. Various modeling and other development tools are used for increased communication and consistency during development of subject software systems. A software configuration management system is one such tool. Software configuration management systems allow teams of developers to work with artifacts of a subject software system.

A software configuration is a set of software artifact versions, where only one version of a given artifact is selected by a given software configuration. A software change-set identifies a logical change to a configuration, and consists of a set of one or more changes to one or more artifacts. That is, a change-set is a repository object that collects a related group of file, folder, and component modifications so that they can be applied to a flow target (workspace or stream) in a single operation. Change-sets are common practice in reversion control systems, such as Rational Team Concert™ that uses an optimistic locking model that does not require a check out operation before modification of files or folders. (Rational Team Concert is a trademark of International Business Machines, Corp. of Armonk, N.Y.) All files in a local workspace are normally writable. Typically, modified files remain private to a repository workspace until delivered. In the Concert Rational Team Concert™ source control example, changes are tracked in a local workspace and displayed in a pending changes view. Each modified component in a workspace can include an unresolved folder, an outgoing folder, or both. However, after making these changes, many developers are faced with the difficulty of understanding and subsequently minimizing the effect change-sets may have on other assets when working with multiple branches/streams. Some changes necessarily flow together, requiring developers to carefully examine and possibly manually apply changes across multiple streams, thus decreasing efficiency and accuracy during change-set delivery.

SUMMARY OF THE INVENTION

Approaches that analyze and manage unresolved (i.e., pending, outgoing) change-sets are provided. Specifically, at least one approach parses the change-set into a plurality (i.e., one or more) of changes to determine the impact each change may have. An alert may be provided to the user indicating whether the change-set should be checked-in based on the determined impact. Specifically, a change-set management tool provides this capability. The change-set management tool includes a parsing module configured to receive an outgoing change-set and to parse the change-set into a plurality of changes. The change-set management tool further comprises an evaluation module configured to evaluate an impact that each of the plurality of changes within the change-set has on source code external to the change-set and other changes of the plurality of changes within the change-set.

In one embodiment, there is a method for managing change-set delivery. In this approach, the method comprises: receiving an outgoing change-set comprising pending changes yet to be resolved; parsing the change-set into a plurality of changes; and evaluating an impact that each of the plurality of changes within the change-set has on source code external to the change-set based on interdependencies between each of the plurality of changes.

In another embodiment, there is a system for managing change-set delivery comprising: at least one processing unit; memory operably associated with the at least one processing unit; and a change-set management tool storable in memory and executable by the at least one processing unit, the change-set management tool comprising: a parsing module configured to: receive an outgoing change-set comprising pending changes yet to be resolved; and parse the change-set into a plurality of changes; and an evaluation module configured to evaluate an impact that each of the plurality of changes within the change-set has on source code external to the change-set based on interdependencies between each of the plurality of changes.

In another embodiment, there is computer-readable storage device storing computer instructions, which when executed, enables a computer system to manage change-set delivery, the computer instructions comprising: receiving an outgoing change-set comprising pending changes yet to be resolved; parsing the change-set into a plurality of changes; and evaluating an impact that each of the plurality of changes within the change-set has on source code external to the change-set based on interdependencies between each of the plurality of changes.

Figure 1:
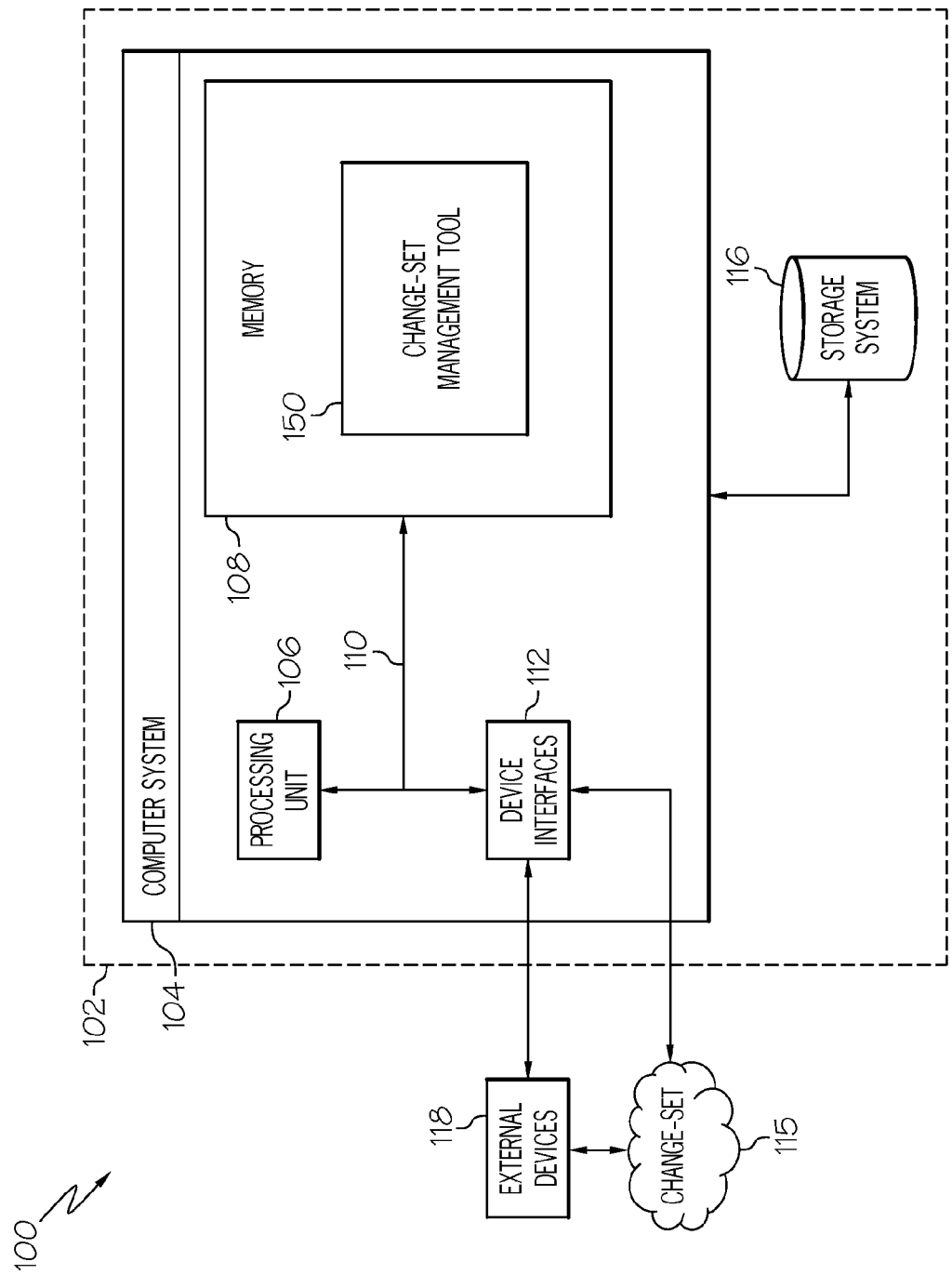
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. Approaches that analyze and manage unresolved (i.e., pending, outgoing) change-sets are provided. Specifically, at least one approach parses the change-set into a plurality (i.e., one or more) of changes to determine the impact each change may have. An alert may be provided to the user indicating whether the change-set should be checked-in based on the determined impact. Specifically, a change-set management tool provides this capability. The change-set management tool includes a parsing module configured to receive an outgoing change-set and to parse the change-set into a plurality of changes. The change-set management tool further comprises an evaluation module configured to evaluate an impact that each of the plurality of changes within the change-set has on other changes of the plurality of changes within the change-set.

This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "calculating," "evaluating," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

Turning now to FIG. 1, a computerized implementation 100 of the present invention will be described in greater detail. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for managing change-set delivery. It should be understood that any other computers implemented under the present invention may have different components/software, but will perform similar functions. As shown, computer system 104 includes a processing unit 106 capable of receiving change-sets 115 and delivering them to memory 108. Also, shown is memory 108 for storing a change-set management tool 150, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing outputs from external devices 118 (e.g., a graphical user interface operated by an end-user) to change-set management tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating change-set management tool 150, which is stored in memory 108 and/or storage system 116. While executing computer program code, processing unit 106 can read and/or write data to/from memory 108 and storage system 116. Storage system 116 can include VCRs, DVRs, RAID arrays, USB hard drives, optical disk recorders, flash storage devices, and/or any other data processing and storage elements for storing and/or processing data. Although not shown, computer system 104 could also include I/O interfaces that communicate with one or more external devices 118 that enable a user to interact with computer system 104 (e.g., a keyboard, a pointing device, a display, etc.), e.g., to submit a change-set 115.

Figure 2:
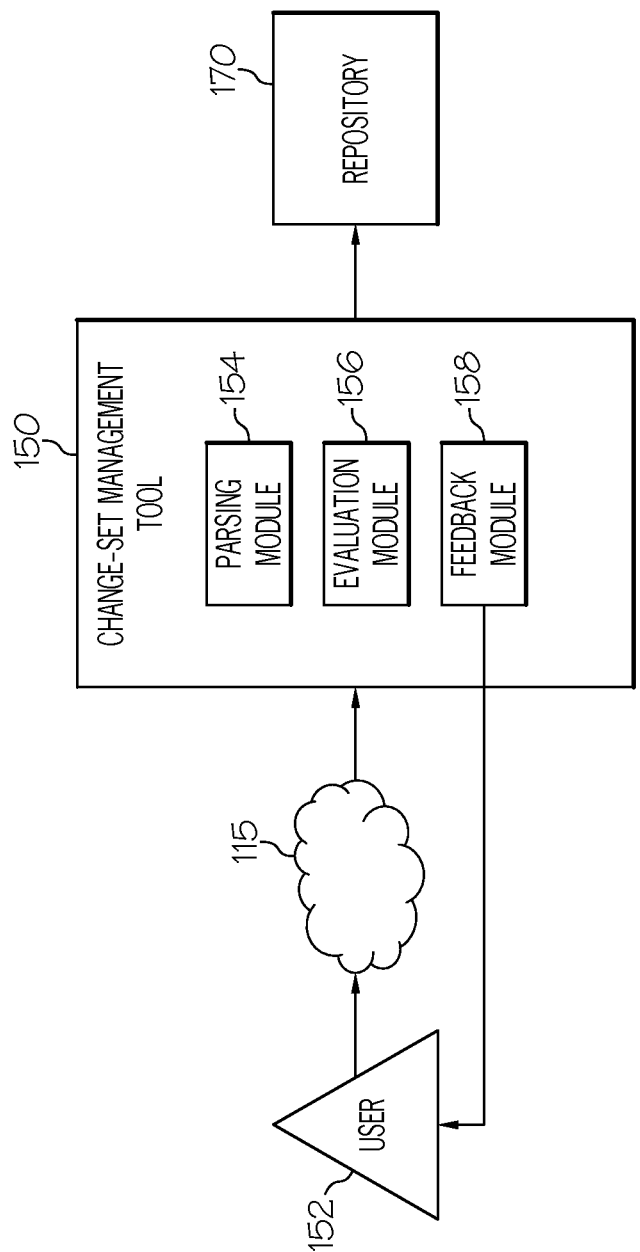
FIG. 2 shows a change-set management tool that operates in the environment shown in FIG. 1.

Turning now to FIG. 2, change-set management tool 150, which parses, evaluates, and groups logical change-sets, will be described in greater detail. As shown, change-set management tool 150 receives change-set 115, which comprises one or more changes, typically input by a user 152 (e.g., a developer or group of developers). Change-set 115 can include changes to the contents of individual files, folders, components and/or changes to a component namespace (such as delete, rename, and move operations). During operation, user 152 submits one or more changes, which are incorporated into an outgoing (i.e., unresolved, pending) change-set 115 to change-set management tool 150, where it is received at a parsing module 154.

Figure 3:
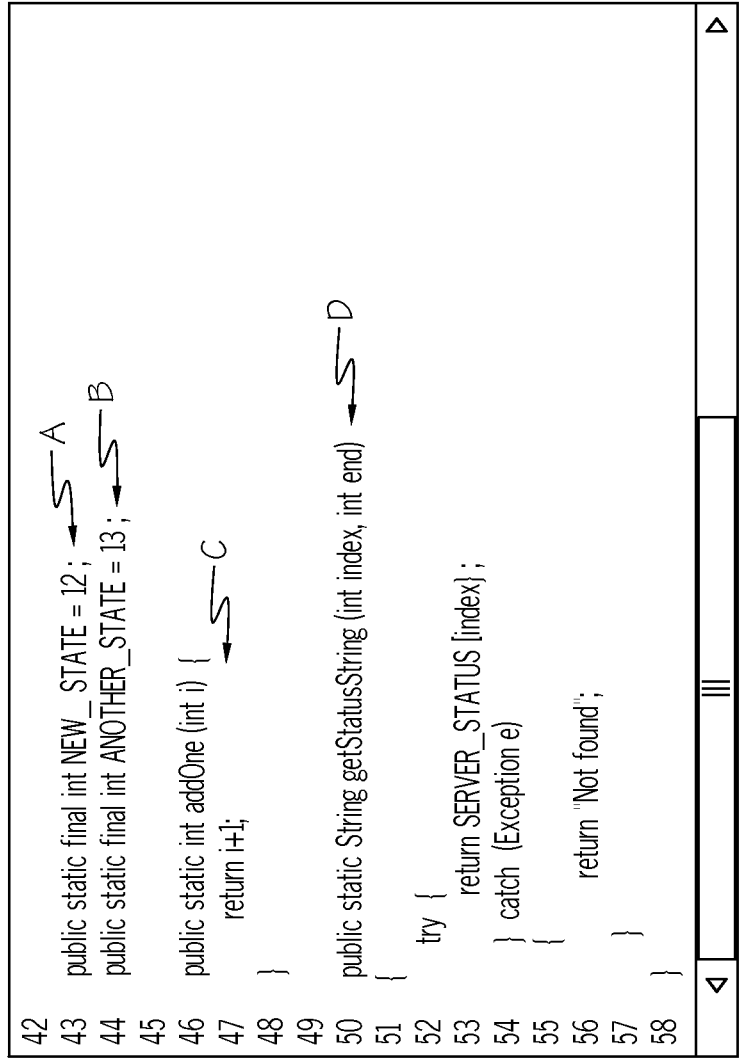
FIG. 3 shows changes made to a file according to embodiments of the invention.

Parsing module 154 parses change-set 115 into a plurality of changes (e.g., into a set of independent files) for further examination. Change-set 115 is sent to an evaluation module 156, which is configured to evaluate an impact caused by each of the submitted changes. Evaluation module 156 evaluates the impact caused on each of the other changes of the plurality of changes within change-set 115 (e.g., variables, class, method), as well as additional source code external to change-set 115 (e.g., other source code in the same class file). In one embodiment, evaluation module 156 receives the parsed individual changes from parsing module 154 and establishes interdependencies between each of the plurality of changes. For example, as shown in FIG. 3, each of the changes A, B, C, and D made to this Java class file change-set is analyzed to determine the impact each change will have on other parts of the class file. In this example, A and B are completely independent and have no impact on existing code, and are therefore safe changes to accept, i.e., check-in at repository 170 (FIG. 2). Change C is also safe to accept as it's a new method added to this class. However, change D can't be delivered without first examining compatibility with other changes and additional source code external to the change-set. Because change-set 115 has been parsed into changes A, B, C, D, it is easier for user 152 to understand coding interdependencies and determine whether to accept the entire change-set or only a portion (e.g., A, B, and C).

In one embodiment, parsing module 154 is configured to generate an additional change-set for at one of the changes in a change-set based on the impact caused by that particular change. For example, if one change adds a new static constant to a Constants class, parsing module 154 may break that change into its own change-set. Changes to the Constants class could be delivered early, as it has high churn (i.e., a relatively high history of changes/versions) and doesn't break any vital relationships. That is, if a file in the change-set has been modified many more times relative to other files in the change-set, the system marks that file as highly volatile. Parsing module 154 puts this file into its own change-set and delivers it separately from other files with lower volatility.

Figure 4:
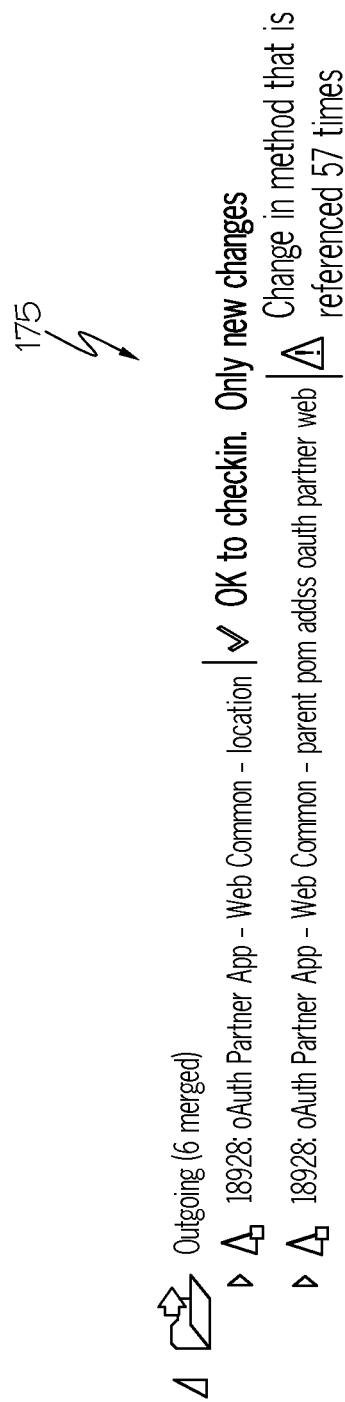
FIG. 4 shows an indication to a user regarding delivery of a change according to embodiments of the invention.

As another example, if the body of the method addOne (i.e., change C) in the Java class file of FIG. 3 uses the constant NEW_STATE (i.e., change A), then a new logical change-set would be created for change C and will have an established interdependency marked with change A. Therefore, a user who accepts this physical change-set may accept change C only if also accepting change A in this particular example. This required interdependency can be sent and displayed to user 152. Based on the evaluated impact to either the changes within change-set 115 or additional source code, a feedback module 158 (FIG. 2) may indicate that change-set 115 should be checked-in with caution due to the interdependency. In another embodiment, as shown in FIG. 4, feedback module 158 may indicate through a textual, visual alert/indication 175 that it's 'ok' to check-in the change-set, as only new changes are present. Once user 152 makes the decision to proceed based on indication 175, evaluation module 156 executes the request to check-in change-set 115 to repository 170.

It can be appreciated that the approaches disclosed herein can be used within a computer system to manage change-set delivery, as shown in FIG. 1. In this case, change-set management tool 150 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 5:
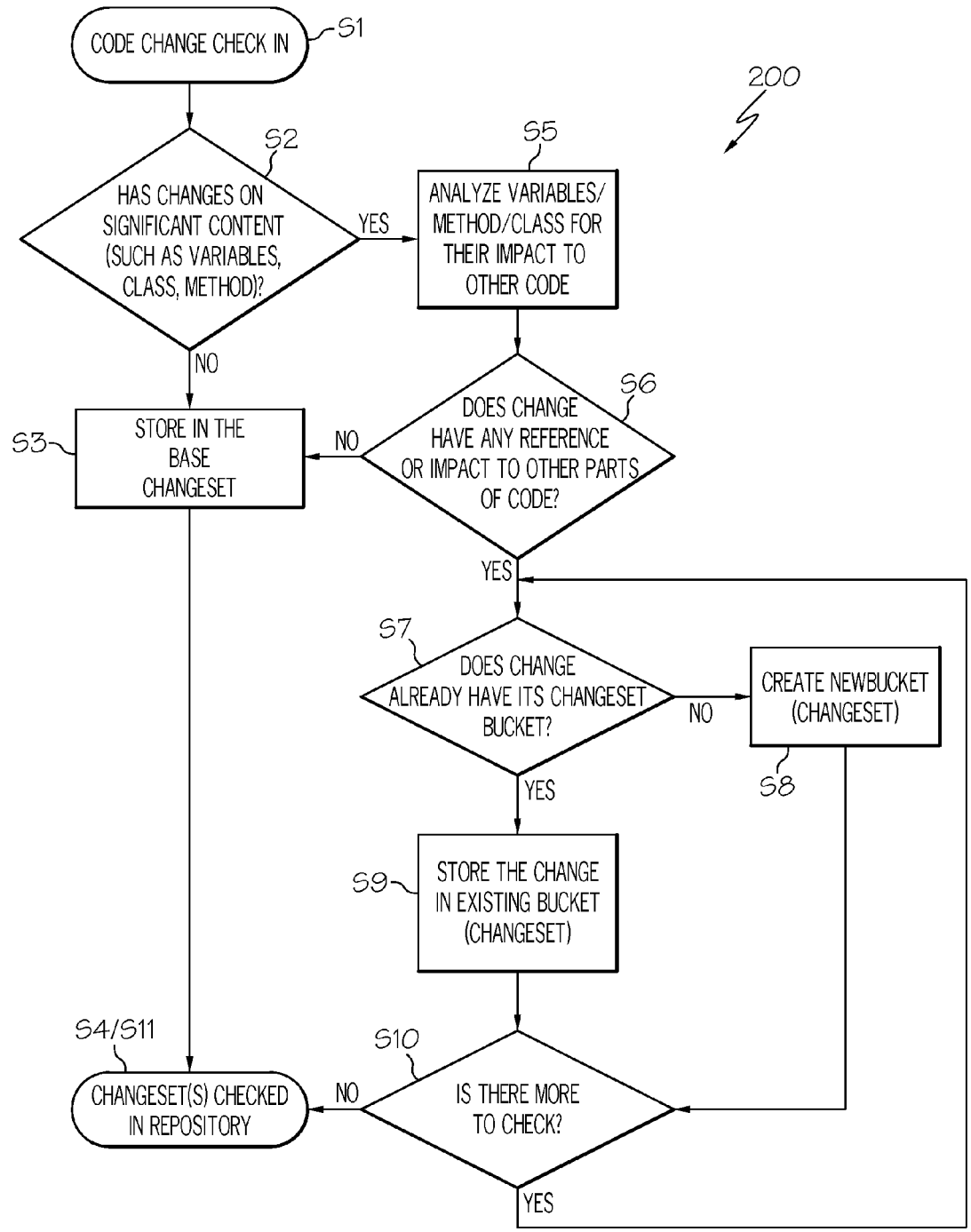
FIG. 5 shows a flow diagram of an approach for managing change-set delivery according to embodiments of the invention.

The program modules carry out the methodologies disclosed herein, as shown in FIG. 5. Shown is a method 200 for managing change-set delivery, wherein, at S1, a user seeks to check-in a code change associated with a current change-set. At S2, the impact of each change is analyzed to determine whether there is a significant change, e.g., to variables, class, method, etc. If no, the change is stored in the base change-set at S3, which is forwarded to the repository for check-in at S4.

Returning to S2, in the event that a significant impact may result from the change(s), evaluation continues at S5 to determine any additional impact to other source code. If it is determined at S6 that the change is interconnected (i.e., references) or impacts other parts of source code, method 200 progresses to S7, where it is determined whether the change is associated with an existing change-set (bucket). If no, a new change-set is created at S8 and, if yes, the change is stored in its existing change-set at S9. If there are no more changes to check at S10, the change-set is checked-in to the repository at S11.

The flowchart of FIG. 5 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

For example, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is apparent that there has been provided an approach for managing change-set delivery. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for managing change-set delivery, comprising:
   receiving an outgoing change-set comprising pending changes yet to be resolved;
   parsing the change-set into a plurality of changes;
   establishing interdependencies between each of the plurality of changes within a same java class file; and
   evaluating an impact that each of the plurality of changes within the change-set has on source code external to the change-set in the same java class file based on the established interdependencies between each of the plurality of changes.

2. The method according to claim 1, further comprising providing a recommendation that the change-set be one of: checked-in, and further evaluated based on the impact caused by at least one of the plurality of changes within the change-set.

3. The method according to claim 1, further comprising evaluating an impact that each of the plurality of changes within the change-set has on each of the other changes of the plurality of changes within the change-set.

4. The method according to claim 3, further comprising executing a request to check-in the change-set.

5. The method according to claim 3, further comprising:
   establishing interdependencies between each of the plurality of changes; and
   establishing, based on the interdependencies, a dependency hierarchy between the plurality of changes.

6. The method according to claim 5, further comprising generating an additional change-set for at least one the plurality of changes.

7. The method according to claim 1, the source code external to the change-set being source code in a same class file as the change-set.

8. A system for managing change-set delivery comprising:
at least one processing unit;
memory operably associated with the at least one processing unit; and
a change-set management tool storable in memory and executable by the at least one processing unit, the change-set management tool comprising:
  a parsing module configured to:
    receive an outgoing change-set comprising pending changes yet to be resolved; and
    parse the change-set into a plurality of changes; and
  an evaluation module configured to:
    establish interdependencies between each of the plurality of changes within a same java class file; and
    evaluate an impact that each of the plurality of changes within the change-set has on source code external to the change-set in the same java class file based on the established interdependencies between each of the plurality of changes.

9. The change-set management tool according to claim 8, further comprising a feedback module configured to provide a recommendation that the change-set be one of: checked-in, and further evaluated based on the impact caused by at least one of the plurality of changes within the change-set.

10. The change-set management tool according to claim 9, the evaluation module further configured to evaluate an impact that each of the plurality of changes within the change-set has on each of the other changes of the plurality of changes within the change-set.

11. The change-set management tool according to claim 10, the evaluation module further configured to execute a request to check-in the change-set.

12. The change-set management tool according to claim 10, the evaluation component further configured to:
  establish interdependencies between each of the plurality of changes; and
  establish, based on the interdependencies, a dependency hierarchy between the plurality of changes.

13. The change-set management tool according to claim 12, the parsing module further configured to generate an additional change-set for at least one the plurality of changes.

14. The change-set management tool according to claim 8, the source code external to the change-set being source code in a same class file as the change-set.

15. A computer-readable storage device storing computer instructions, which when executed, enables a computer system to manage change-set delivery, the computer instructions comprising:
  receiving an outgoing change-set comprising pending changes yet to be resolved;
  parsing the change-set into a plurality of changes;
  establishing interdependencies between each of the plurality of changes within a same java class file; and
  evaluating an impact that each of the plurality of changes within the change-set has on source code external to the change-set in the same java class file based on the established interdependencies between each of the plurality of changes.

16. The computer-readable storage device according to claim 15 further comprising computer instructions for providing a recommendation that the change-set be one of: checked-in, and further evaluated based on the impact caused by at least one of the plurality of changes within the change-set.

17. The computer-readable storage device according to claim 15, further comprising computer instructions for evaluating an impact that each of the plurality of changes within the change-set has on each of the other changes of the plurality of changes within the change-set.

18. The computer-readable storage device according to claim 17 further comprising computer instructions for executing a request to check-in the change-set.

19. The computer-readable storage device according to claim 17 further comprising computer instructions for:
  establishing interdependencies between each of the plurality of changes; and
  establishing, based on the interdependencies, a dependency hierarchy between the plurality of changes.

20. The computer-readable storage device according to claim 19 further comprising computer instructions for generating an additional change-set for at least one the plurality of changes.

* * * * *